US012571775B2

(12) United States Patent
Kapp et al.

(10) Patent No.: US 12,571,775 B2
(45) Date of Patent: Mar. 10, 2026

(54) METHOD FOR DETERMINING A PROPERTY OF A SAMPLE FLUID OR A RESONANT FREQUENCY OF A RESONATOR CELL

(71) Applicant: Fraunhofer-Gesellschaft zur Förderung der angewandten Forschung e.V., Munich (DE)

(72) Inventors: Johannes Kapp, Waldkirch (DE); Katrin Schmitt, Biederbach (DE); Christian Weber, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 302 days.

(21) Appl. No.: 18/038,784

(22) PCT Filed: Nov. 22, 2021

(86) PCT No.: PCT/EP2021/082481
§ 371 (c)(1),
(2) Date: May 25, 2023

(87) PCT Pub. No.: WO2022/112163
PCT Pub. Date: Jun. 2, 2022

(65) Prior Publication Data
US 2024/0102970 A1     Mar. 28, 2024

(30) Foreign Application Priority Data
Nov. 26, 2020     (EP) ..................................... 20209980

(51) Int. Cl.
| | |
|---|---|
| *G01N 29/24* | (2006.01) |
| *G01N 29/024* | (2006.01) |
| *G01N 29/036* | (2006.01) |

(52) U.S. Cl.
CPC ....... *G01N 29/2425* (2013.01); *G01N 29/024* (2013.01); *G01N 29/036* (2013.01);
(Continued)

(58) Field of Classification Search
CPC ............. G01N 29/2425; G01N 29/024; G01N 29/036; G01N 2291/0215;
(Continued)

(56) References Cited

U.S. PATENT DOCUMENTS

| | | | | |
|---|---|---|---|---|
| 4,055,764 A | * | 10/1977 | Dimeff ................... | G01N 21/37 |
| | | | | 250/336.1 |
| 2019/0212259 A1* | | 7/2019 | Carbonelli ......... | G01N 29/2418 |

FOREIGN PATENT DOCUMENTS

| | | | |
|---|---|---|---|
| CN | 109490216 A | | 3/2019 |
| WO | 2018/096091 A1 | | 5/2018 |
| WO | WO2018096091 | * | 5/2018 |

OTHER PUBLICATIONS

European Search Report and Search Opinion received for EP Application No. 20209980.0, mailed on May 11, 2021, 8 pages.
(Continued)

*Primary Examiner* — Tarun Sinha
(74) *Attorney, Agent, or Firm* — MEDLER FERRO WOODHOUSE & MILLS PLLC

(57)     ABSTRACT

A method including providing an acoustic resonator having an absorption element with a surface portion, providing a sample fluid or a fluid mixture containing the sample fluid with at least one absorption fluid or particles such that the acoustic resonator is filled with the same, the surface portion of the absorption element being in contact with the sample fluid. Irradiating the surface portion of the absorption element with a first electromagnetic radiation such that the absorption element at least partly absorbs the first electromagnetic radiation in the region of the surface portion, or
(Continued)

Figure 1:
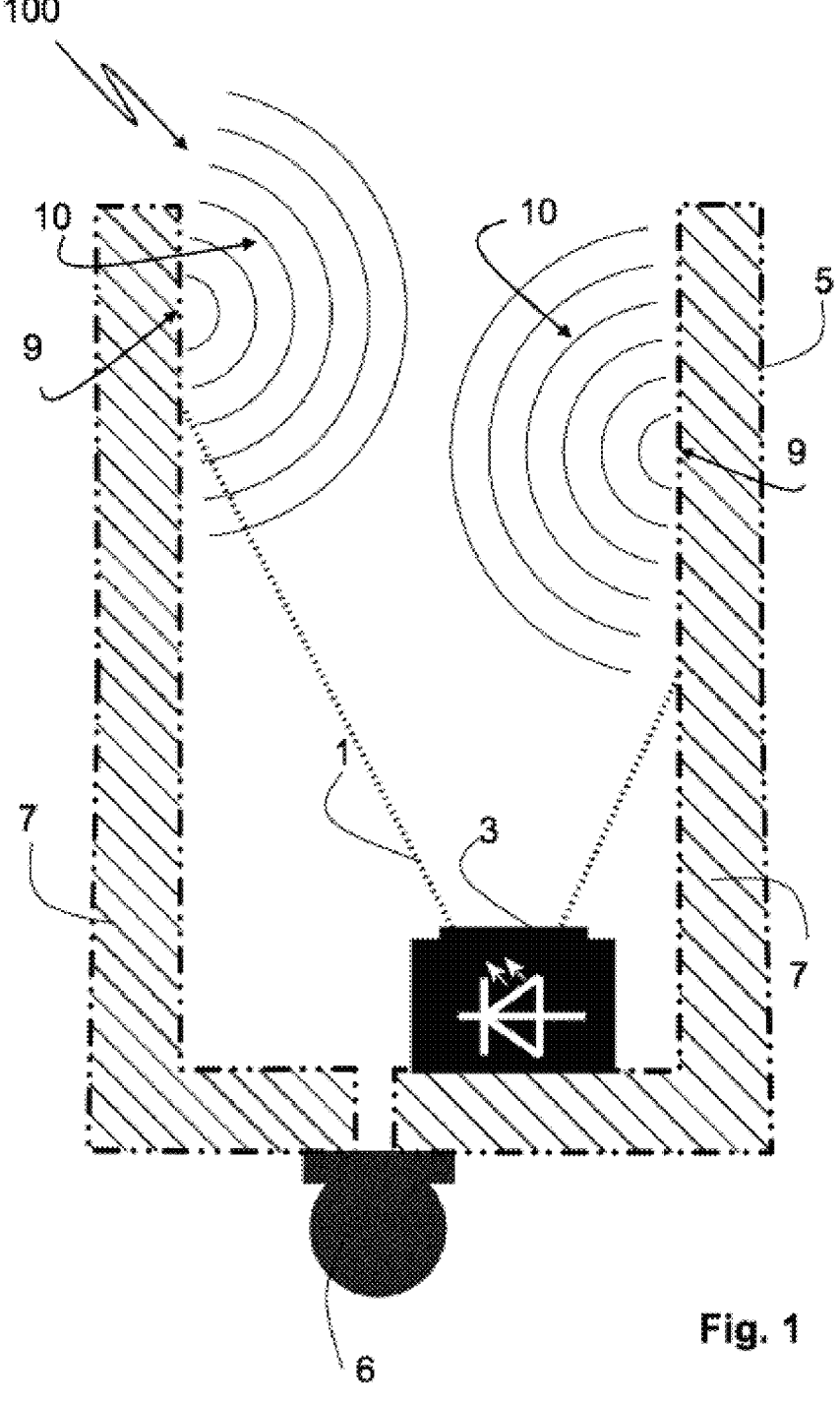

irradiating the fluid mixture with a first electromagnetic radiation such that the absorption fluid or the absorption particles at least partly absorb(s) the first electromagnetic radiation, and so, by way of the absorption, pressure energy is generated in the sample fluid or the fluid mixture, with the first electromagnetic radiation being amplitude modulated or frequency modulated with a modulation frequency. Measuring an acoustic response signal from the acoustic resonator. Determining at least one amplitude or phase of the acoustic response signal.

21 Claims, 4 Drawing Sheets

(52) U.S. Cl.
CPC ................ *G01N 2291/0215* (2013.01); *G01N 2291/0217* (2013.01)

(58) Field of Classification Search
CPC ..... G01N 2291/0217; G01N 2291/014; G01N 2291/021; G01N 2291/022; G01N 21/1702; G01N 29/32; G01N 29/46; G01N 2291/012; G01N 2291/015; G01N 2291/02809; G01N 2291/02818; G01N 29/032; G01N 29/346; G01N 29/348; G01H 13/00
See application file for complete search history.

(56) References Cited

OTHER PUBLICATIONS

International Search Report and Written Opinion received for PCT Patent Application No. PCT/EP2021/082481, mailed on Feb. 16, 2022, 21 pages (10 pages of English Translation and 21 pages of Original Document).

Miklos, A., et al., "An experimental methodology for characterizing the responsivity of the photoacoustic cell for gases at reduced pressure by means of the vibrating strip as the calibrating sound source", Measurement Science and Technology, vol. 2, No. 10, 1991, pp. 957-962.

* cited by examiner

METHOD FOR DETERMINING A PROPERTY OF A SAMPLE FLUID OR A RESONANT FREQUENCY OF A RESONATOR CELL

CROSS REFERENCE TO RELATED APPLICATIONS

This application is a National Stage of International Application No. PCT/EP2021/082481 filed Nov. 22, 2021, which claims benefit of European Patent Application No. 20 20 9980.0 filed Nov. 26, 2020, both of which are herein incorporated by reference in their entirety.

The present invention relates to a method by which an amplitude or phase of an acoustic response signal of an acoustic resonator is determined. The present invention also relates to a photoacoustic method for determining a property of a sample fluid based on the aforementioned method. Furthermore, the present invention relates to a device by which the aforementioned methods can be carried out, as well as to a use of this device for exhaust gas measurement in a motor vehicle or for pollutant measurement in ambient air.

Protecting the environment from pollutants has been, and remains, a very important topic, especially with regard to air pollution in major cities and the challenges of climate change. Against this background, demand for analytical methods and devices for determining the concentration of pollutants in fluids is increasing. This relates in particular to pollutants in gaseous form, such as nitrogen oxides or carbon dioxide, since the former has an immediate adverse effect on human health and the latter contributes significantly to the greenhouse effect in the atmosphere and thus to climate change. Among other techniques, photoacoustic methods are employed for determining the concentration of these and other gases in a gaseous mixture.

In a photoacoustic method, a fluid mixture, in particular a gaseous mixture for which the concentration of a sample gas (such as nitrogen dioxide) is to be determined is irradiated with incident electromagnetic radiation, wherein the electromagnetic radiation has a frequency of its alternating electromagnetic field that is equal to an absorption frequency of the sample gas. As a result, the sample gas molecules contained in the gaseous mixture absorb the incident electromagnetic radiation, thereby resulting in heating and therefore in thermal expansion of the entire gaseous mixture.

In order to be able to draw conclusions regarding the concentration of the sample gas from the irradiation of the gas, the incident electromagnetic radiation is modulated such that the thermal expansion of the gaseous mixture occurs periodically and thus a sound wave forms within the gaseous mixture. By measuring the intensity of this sound wave, for example by means of a microphone, the concentration of the sample gas within the gaseous mixture can be deduced. When such a photoacoustic method is carried out, the gaseous mixture is advantageously located in a resonator cell which represents an acoustic resonator having a resonant frequency. The intensity of the sound wave can then be amplified by setting the modulation frequency of the incident electromagnetic radiation to the value of the resonant frequency. This enables an improved signal-to-noise ratio when measuring the intensity of the sound wave.

As described above, the electromagnetic radiation to be absorbed is typically modulated such that the frequency of the sound wave is equal to the resonant frequency of the acoustic resonator in order to achieve the best possible amplification of the intensity of the sound waves. However, the resonant frequency is not an unchangeable quantity. It varies in particular in dependence upon variable environmental parameters such as temperature, gas composition and pressure. During the performance of a photoacoustic method, it is therefore necessary to know continuously the current actual resonant frequency of the acoustic resonator in order to be able to vary the incident electromagnetic radiation accordingly. In other words, the resonant frequency of the acoustic resonator must be tracked when performing the method so that the desired amplification can be carried out constantly.

Conventionally, such a tracking could be carried out in that by testing different modulation frequencies of the incident electromagnetic radiation absorbed by the sample gas molecules, it is determined at which frequency the resonant frequency of the acoustic resonator lies. This is, however, associated with a large time cost, so that the actual measurement for determining the concentration of the sample gas must also be repeatedly interrupted. In the cases of very low sample gas concentration, which are very common in practice, due to the measurement principle of the photoacoustic method, the signal-to-noise ratio is also very small when determining the resonant frequency.

A tracking can also be carried out in that a loudspeaker within the acoustic resonator generates a sound wave and the resonant frequency is determined by the modulation of the sound wave. However, this use of a loudspeaker is associated with a high design effort.

As an alternative to tracking the resonant frequency, it has previously been proposed to construct the acoustic cell in a temperature-stabilised manner, since the temperature variation has a major effect on the detuning of the resonant frequency. However, this can only be achieved with an additional, costly construction.

Against this background, it is an object of the present invention to provide a method as well as a device with which the resonant frequency of an acoustic resonator can be determined as simply as possible. When performing a photoacoustic method, a simple tracking of the resonant frequency of the acoustic resonator is thus enabled.

This object is achieved with a method according to claim 1. According to the present invention, the method comprises the following steps:

a) according to a first alternative, providing an acoustic resonator, the acoustic resonator comprising an absorption element having a surface portion, providing a sample fluid or a fluid mixture comprising the sample fluid such that the acoustic resonator is filled with the sample fluid or the fluid mixture comprising the sample fluid, wherein the surface portion of the absorption element is in contact with the sample fluid or the fluid mixture comprising the sample fluid, or according to a second alternative, providing an acoustic resonator, providing a fluid mixture comprising a sample fluid such that the acoustic resonator is filled with the fluid mixture, wherein the fluid mixture comprises, in addition to the sample fluid, at least one absorption fluid or one or more absorption particles, b) according to the first alternative, irradiating the surface portion of the absorption element with a first electromagnetic radiation such that the absorption element at least partially absorbs the first electromagnetic radiation in the region of the surface portion, or according to the second alternative, irradiating the fluid mixture with a first electromagnetic radiation such that the absorption fluid or the absorption particles at least partially absorb the first electromagnetic radiation, such that, in both alternatives, the absorption generates pressure energy in the sample fluid or the fluid mixture comprising the sample fluid, wherein the first electromagnetic radiation is amplitude modulated or frequency modulated at a modulation frequency, c) measuring an acoustic response signal of the acoustic resonator, said signal being generated by the absorption of the first electromagnetic radiation taking place in step b), d) determining at least one amplitude (A) or phase ($\varphi$) of the acoustic response signal comprising the modulation frequency of the first electromagnetic radiation.

In one embodiment of the method according to the present invention, the sample fluid is a sample gas or the fluid mixture comprising the sample fluid is a gaseous mixture comprising the sample gas.

It should be noted that the method according to the invention can generally be used for the analysis of fluids, in particular of all types of trace gases in gaseous mixtures, and in particular is not limited to use for pollutants. In a particular embodiment, on the other hand, the method is specifically used for the detection of pollutants.

An acoustic response signal of the acoustic resonator should be understood to mean a variation in pressure within the acoustic resonator caused by the absorption of the first electromagnetic radiation. This variation in pressure is physically described as a sound wave or sound pulse. Seen from a measurement perspective, the acoustic response signal is, for example, a time series of the pressure recorded by a single local acoustic sensor.

An absorption element of the acoustic resonator in the sense of the first alternative should be understood as an element of the acoustic resonator that is capable of at least partially absorbing the first electromagnetic radiation. An absorption element may be either an additional constructive element or an element intrinsic to the acoustic resonator, such as a side wall or the resonator bottom. In one embodiment of the method according to the invention, a first side wall of the acoustic resonator or a part of the first side wall of the acoustic resonator is the absorption element.

The method according to the invention allows the determination of a resonant frequency of the acoustic resonator and thus provides, among other things, the basis for a photoacoustic method in which the resonant frequency can be efficiently tracked.

Moreover, the method according to the invention allows the determination of a property of the fluid or fluid mixture located in the acoustic resonator, such as the velocity of sound in this fluid or fluid mixture.

In a particular embodiment of the present invention, ambient air or a gaseous mixture comparable thereto is contained in the acoustic resonator. In this embodiment, the velocity of sound is determined using the method according to the invention described above. In addition, the temperature and the moisture content of the ambient air or of the comparable gaseous mixture are determined. In this embodiment, the concentration of carbon dioxide in the ambient air or the gaseous mixture comparable thereto is determined from the parameters sound velocity, temperature and moisture content thus determined in this embodiment.

In one embodiment of the method according to the invention, step b) is carried out at least twice, wherein the first electromagnetic radiation is modulated during a first execution of step b) at a first modulation frequency and is modulated during a second execution of step b) at a second modulation frequency, wherein the second modulation frequency is different from the first modulation frequency, so that in step d) at least a first amplitude or phase ($\varphi1$) for the first modulation frequency, and a second amplitude or phase ($\varphi2$) for the second modulation frequency are determined.

According to this embodiment of the invention, the modulation frequency of the first electromagnetic radiation is tuned, preferably within a previously delineated frequency range. This can advantageously be used to find and determine the resonant frequency of the acoustic resonator. The frequency range in which such a tuning of the modulation frequency preferably takes place is directed in one embodiment according to an expected value for the resonant frequency. This expected value is again based on the geometrical shape of the acoustic resonator, by which the resonant frequency is significantly predetermined, and optionally according to ambient parameters measured in parallel such as the ambient temperature or the moisture content of a gas or gaseous mixture located in the acoustic resonator.

In one embodiment of the method according to the invention, the following further step is provided:

e) determining an amplitude response or phase response dependent on the modulation frequency from the at least two amplitudes or phases determined in step d) of the acoustic response signal.

An amplitude response or phase response dependent on the modulation frequency is a two-dimensional matrix in the mathematical sense, in which amplitude values or phase values undergo a mapping in relation to modulation frequencies. On the basis of such a matrix, a mapping of amplitudes or phase values in relation to modulation frequencies of the first electromagnetic radiation can also be presented in the form of a graph. The shape of this graph is referred to as amplitude response or phase response. However, in the sense of the present invention, the matrix underlying such a graph is also to be understood as an amplitude response or phase response.

From an amplitude response or phase response determined in the sense of this embodiment of the invention, the resonant frequency of the acoustic resonator can be determined particularly easily by determining the maximum of the amplitude or phase response, wherein the modulation frequency associated with this maximum then represents the resonant frequency being sought.

In one embodiment of the method according to the invention, in step b), the first electromagnetic radiation is amplitude modulated or frequency modulated such that a wide-band acoustic response signal of the acoustic resonator is generated, wherein the following further step is provided:

f) determining an amplitude response or phase response dependent upon the modulation frequency from the wide-band acoustic response signal measured in step c), preferably by applying a frequency analysis, and particularly preferably by applying a Fourier transform to the wide-band acoustic response signal measured in step c).

This method step may be used in addition to or alternatively to a tuning of the modulation frequency of the first electronic radiation to determine the amplitude response or phase response. An advantage of this embodiment is that by exciting a wide-band acoustic response signal, a particularly fast determination of the amplitude response or phase response is enabled and thus also a particularly fast determination of the resonant frequency of the acoustic resonator.

In one embodiment of the method according to the invention, the first electromagnetic radiation is amplitude modulated with a square wave signal. Due to the steep edge of the square-wave signal and the plurality of modulation frequencies contained therein, such a modulation advantageously leads to an excitation of a wide-band acoustic response signal, such that an efficient determination of the amplitude response or phase response can be carried out in conjunction with a frequency analysis.

The frequency analysis is particularly preferably performed by applying a fast Fourier transform (FFT).

In one embodiment of the method according to the invention, the first electromagnetic radiation has a frequency of the alternating electromagnetic field that is not equal to an absorption frequency of the sample fluid, wherein the first electromagnetic radiation preferably has a wavelength or a wavelength range that is between 380 nm and 1200 nm.

In one embodiment of the method according to the invention, a property of the acoustic resonator is determined in a further step, wherein in particular, one of the following steps or both of the following steps can be provided:

g) determining a resonant frequency of the acoustic resonator from at least one amplitude or phase determined in step d), h) determining a damping property of the acoustic resonator.

The method according to the invention is advantageously used in the sense of this embodiment to determine a property of the acoustic resonator in order to optimise another method to be performed with the acoustic resonator. A damping property of the acoustic resonator can be the damping coefficient of the acoustic resonator or the damping coefficient of a partial range of the acoustic resonator, for example, a wall region of the acoustic resonator.

The method according to the invention can represent a method for determining a property of the acoustic resonator.

In one embodiment of the method according to the invention, in a further step, a property of the fluid or fluid mixture located in the acoustic resonator is determined, wherein in particular, one of the following steps or both of the following steps can be provided:

i) determining a velocity of sound of the fluid or fluid mixture located in the acoustic resonator, or j) determining a density of the fluid or fluid mixture located in the acoustic resonator, or a concentration of the sample fluid, if the sample fluid is a constituent of a fluid mixture located in the acoustic resonator.

Steps i) and j) can also be provided interlocked such that a velocity of sound is initially determined according to step i) and a density or concentration is determined from the velocity of sound according to step j).

In one embodiment, the method according to the invention is a method for determining a property of the fluid or fluid mixture located in the acoustic resonator.

In one embodiment of the method according to the invention, this represents a photoacoustic method for determining a property of a sample gas with the following steps:

aa) determining a resonant frequency of the acoustic resonator with an embodiment of the method described above, bb) irradiating the sample gas or the gaseous mixture comprising the sample gas with a second electromagnetic radiation, wherein the second electromagnetic radiation comprises at least one frequency of its alternating electromagnetic field, which is equal to an absorption frequency of the sample gas, and wherein the second electromagnetic radiation is amplitude modulated or frequency modulated at a modulation frequency, wherein the modulation frequency is substantially equal to the resonant frequency of the acoustic resonator determined in step aa), cc) measuring an acoustic response signal of the acoustic resonator generated by an absorption by the sample gas of the second electromagnetic radiation which takes place in step bb), dd) determining the property of the sample gas from the acoustic response signal of the acoustic resonator.

This embodiment of the method according to the invention allows the user to determine the resonant frequency of the acoustic resonator in an advantageous manner when performing a photoacoustic method, namely without the second electromagnetic radiation having to be used for heating the sample gas and thus for the determination of a property of the sample gas, and even for determining the resonant frequency. This facilitates tracking of the resonant frequency. The photoacoustic method thus becomes more efficient and at the same time more robust with regard to varying environmental parameters such as temperature, gas composition or pressure.

In step aa) of the photoacoustic method, preferably the first alternative of the method according to claim 1 or the second alternative of the method according to claim 1 with an additional absorption gas is not used but the second alternative of the method according to claim 1 with absorption particles is used, because absorption particles present in the gaseous mixture also at least partially absorb the second electromagnetic radiation and this results in a worse signal-to-offset ratio in photoacoustic methods.

In one embodiment, the acoustic response signal to be measured in step cc) and the acoustic response signal to be measured in step aa) are two acoustic response signals that can be measured successively in time. In this embodiment, irradiating with the first electromagnetic radiation and irradiating with the second electromagnetic radiation take place at different times.

In an alternative embodiment, the acoustic response signal to be measured in step cc) and the acoustic response signal to be measured in step aa) are two acoustic response signals superimposed in time, which are measured together in a common step. In this embodiment, irradiating with the first electromagnetic radiation and irradiating with the second electromagnetic radiation occur at least intermittently simultaneously, wherein the modulation frequency of the first electromagnetic radiation is different from the modulation frequency of the second electromagnetic radiation. In this case, the acoustic signal measured in a common step is subsequently separated to separate the acoustic response signal generated by an absorption by the sample gas of the second electromagnetic radiation which takes place in step bb) from the acoustic response signal generated by the absorption of the first electromagnetic radiation taking place in step b).

In one embodiment of the method according to the invention, the property of the sample gas is the density or concentration of the sample gas. This property is often of particular relevance, especially in applications in the field of environmental protection.

In one embodiment of the method according to the invention, the property of the sample gas is determined multiple times over a process duration at least with steps bb), cc) and dd), wherein, during the duration of the process, preferably periodically and particularly preferably before each performance of the step bb), the resonant frequency of the acoustic resonator is determined by means of step aa), such that, when performing step bb), the modulation frequency of the second electromagnetic radiation is always equal to the currently determined resonant frequency.

This advantageously ensures that a regular adjustment of the modulation frequency to the varying resonant frequency of the acoustic resonator is carried out so that the signal-to-noise ratio of the acoustic response signal of the acoustic resonator is optimised over the entire duration of the method, that is, is substantially maximal.

In one embodiment of the method according to the invention, the second electromagnetic radiation has a wavelength or wavelength range that is between 780 nm and 1 mm.

In one embodiment of the method according to the invention, the second electromagnetic radiation is conducted such that it is not absorbed by a surface of the acoustic resonator. This ensures that there is no further absorption by parts of the acoustic resonator other than the desired absorption of the first electromagnetic radiation to determine the resonant frequency. The determination of the resonant frequency by means of the first electromagnetic radiation is thus not interfered with at least by the second electromagnetic radiation. In addition, the measurement of the acoustic response signal resulting from the irradiation with the second electromagnetic radiation is also not interfered with by undesirable wall absorption.

The object underlying the invention is also achieved by a device for carrying out the method according to the invention in accordance with any one of the embodiments described above. This is a device having at least one radiation source for generating a first electromagnetic radiation, an acoustic resonator, comprising an absorption element having a surface portion, wherein the surface portion of the absorption element is arranged in such a way that the surface portion is in contact with a sample fluid or a fluid mixture comprising the sample fluid, when the acoustic resonator is filled with the sample fluid or the fluid mixture comprising the sample fluid, wherein the absorption element is configured to absorb the first electromagnetic radiation at least partially in the region of the surface portion, such that pressure energy is generated in the sample fluid or fluid mixture comprising the sample fluid when the acoustic resonator is filled with the sample fluid or the fluid mixture comprising the sample fluid, a sonic sensor for measuring an acoustic response signal of the resonator, wherein the at least one radiation source and the acoustic resonator are configured and arranged such that the first electromagnetic radiation is incident upon the surface portion of the absorption element.

Where aspects of the invention are described herein with regard to the device, these also apply to the corresponding method, and vice versa. Where the method is carried out with a device according to this invention, this device comprises the corresponding devices for this purpose. In particular, embodiments of the device are suitable for carrying out the embodiments of the method as described above.

In one embodiment of the device according to the invention, a radiation source for generating a second electromagnetic radiation is provided, wherein the acoustic resonator comprises a first opening or a first window, which is at least partially transparent for the second electromagnetic radiation, wherein the acoustic resonator and the radiation source of the second electromagnetic radiation are arranged in such a manner that the second electromagnetic radiation enters the acoustic resonator through the first opening or window.

This embodiment of the device according to the invention allows in particular an advantageous execution of a photoacoustic method according to the invention with a first and a second electromagnetic radiation.

In the sense of this embodiment, the radiation source for generating a first electromagnetic radiation and the source for generating a second electromagnetic radiation can be separate radiation sources or a single radiation source.

In the case of a single radiation source, preferably at least one additional optical element is provided, which is configured such that the electromagnetic radiation emitted by the single radiation source divides into a first and a second electromagnetic radiation, and the wavelength of the first electromagnetic radiation and the wavelength of the second electromagnetic radiation are different. Alternatively, a single radiation source for generating electromagnetic radiation is provided, which is configured and arranged such that the beam path of the radiation is modifiable and in a first setting of the beam path, the generated electromagnetic radiation is the first electromagnetic radiation and in a second setting of the beam path the generated electromagnetic radiation is the second electromagnetic radiation. In this alternative, the irradiation with the first electromagnetic radiation and the irradiation with the second electromagnetic radiation occurs not simultaneously but sequentially.

In one embodiment of the device according to the invention, the acoustic resonator comprises a second opening or a second window, which at least for the second electromagnetic radiation is at least partially transparent, wherein the acoustic resonator and the radiation source of the second electromagnetic radiation are configured and arranged such that the second electromagnetic radiation passes through the second opening or the second window out of the acoustic resonator.

In one embodiment of the device according to the invention, the acoustic resonator is configured such that by irradiating the surface portion with the first electromagnetic radiation in the case of an acoustic resonator filled with the sample fluid, a standing sound wave with at least one pressure maximum forms within the resonator, wherein the acoustic resonator and the radiation source of the first electromagnetic radiation are configured and arranged such that the surface portion irradiated by the first electromagnetic radiation is arranged at a location which is substantially equal to the location of the pressure maximum of the standing wave.

The thermal excitation of the surface portion by means of the first electromagnetic radiation in the region of the pressure maximum is particularly advantageous, since the signal-to-offset ratio of the acoustic response signal resulting from this excitation is maximal.

In one embodiment of the device according to the invention, a first radiation source for generating the first electromagnetic radiation and a separate second radiation source for generating the second electromagnetic radiation are provided, wherein preferably the first radiation source is a light emitting diode (LED) in the visible spectral region and the second radiation source is an LED in the infrared spectral region.

In one embodiment of the device according to the invention, the radiation source of the first electromagnetic radiation is configured and arranged such that the first electromagnetic radiation enters the acoustic resonator through an opening or a window, wherein, in the case of a window, the window is at least partially transparent for both the first and second electromagnetic radiation, or alternatively, the radiation source of the first electromagnetic radiation is configured and arranged such that the first electromagnetic radiation is generated within the acoustic resonator.

In addition, the present invention relates to a use of the device according to the invention for measuring exhaust gases in a motor vehicle, for pollutant measurement in ambient air, or for measuring the hydrogen concentration in a gaseous mixture.

Figure 2:
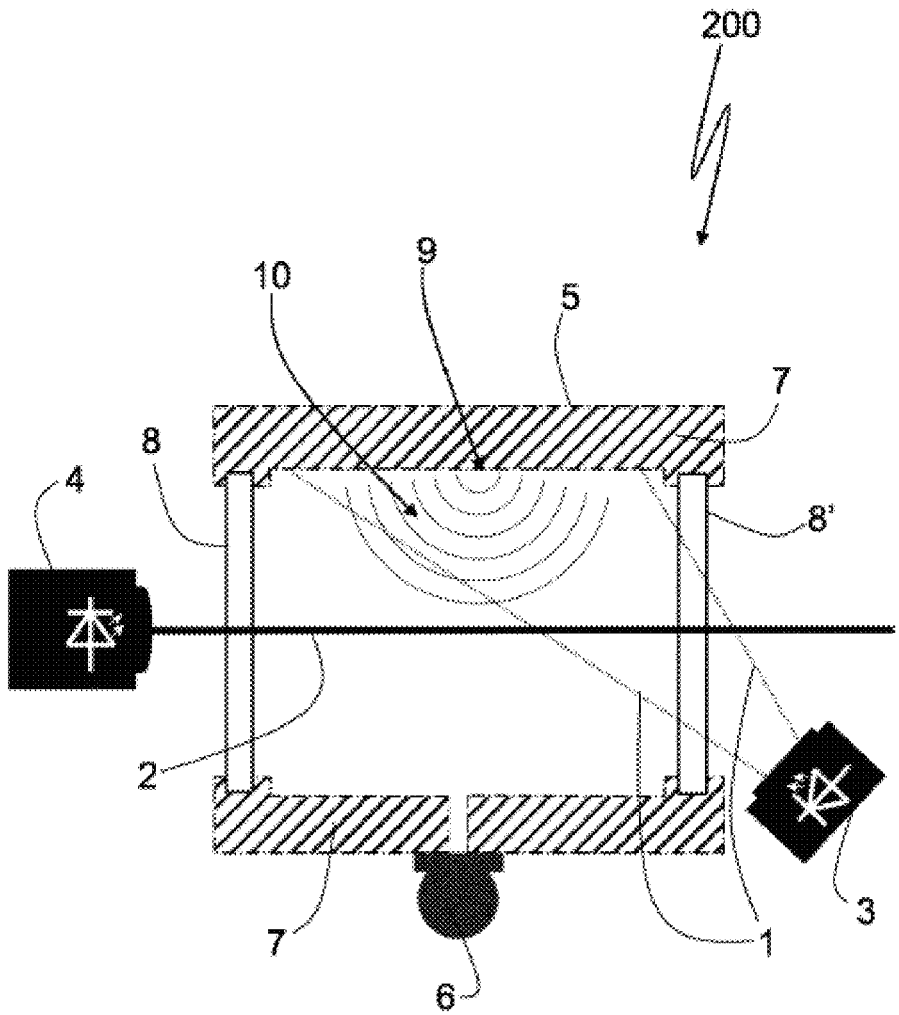
Figure 3:
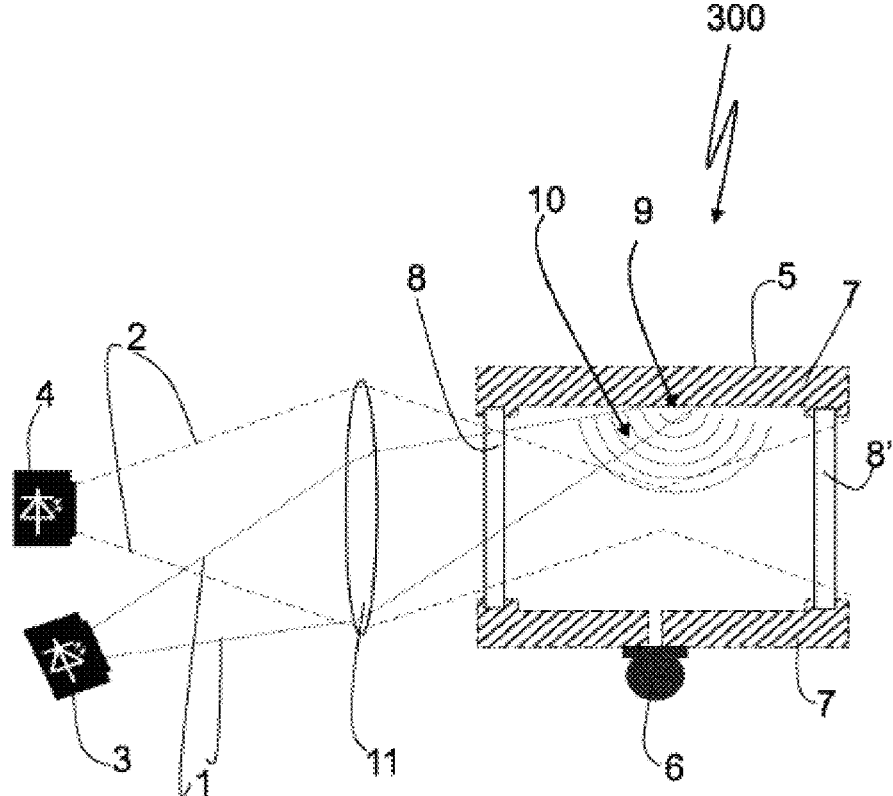
Figure 4:
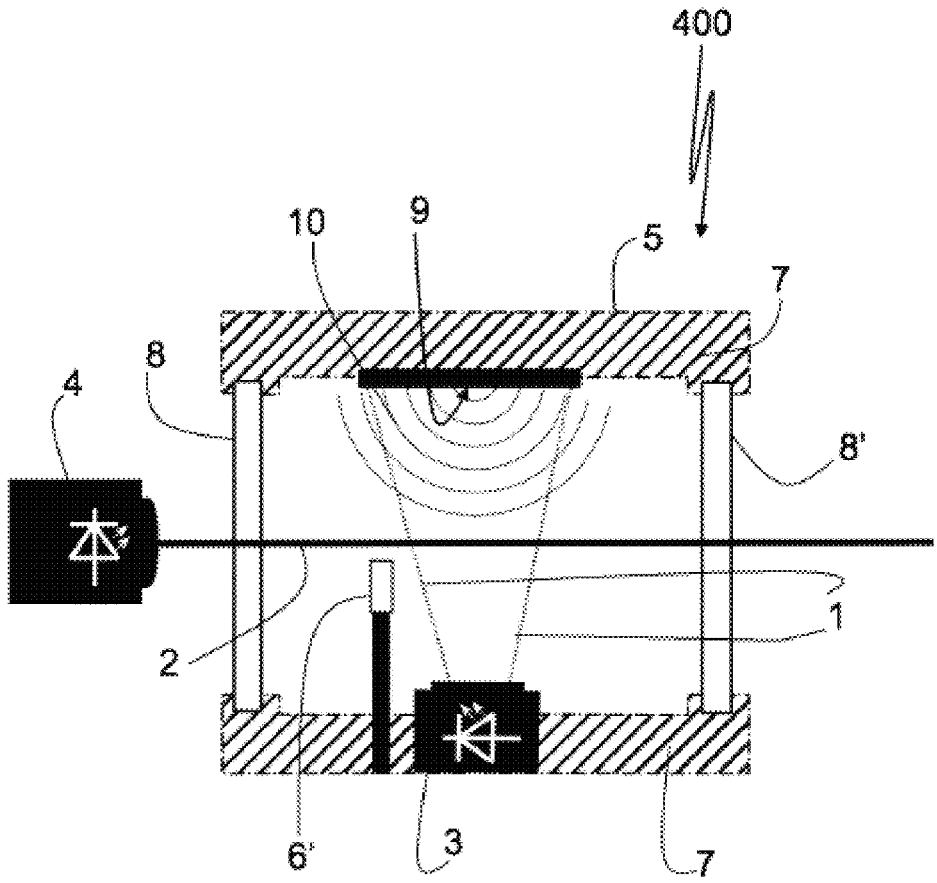

Further advantages, features and embodiments of the present invention are disclosed in the following figures and the accompanying description. In the figures:

FIG. 1: shows a schematic side view of a first embodiment of the device according to the invention with which a first embodiment of the method according to the invention can be carried out, FIG. 2: shows a schematic side view of a second embodiment of the device according to the invention with which a second embodiment of the method according to the invention can be carried out, FIG. 3: shows a schematic side view of a third embodiment of the device according to the invention with which a third embodiment of the method according to the invention can be carried out, FIG. 4: shows a schematic side view of a fourth embodiment of a device according to the invention, with which a fourth embodiment of the method according to the invention can be carried out.

The first embodiment of the device 100 according to the invention shown in FIG. 1 is a special device that only comprises as many elements as necessary to realise the underlying concept of the invention. A single radiation source 3 is provided that generates a first electromagnetic radiation 1. The beam path of the first electromagnetic radiation is therein divergent. The radiation source 3 is arranged such that the first electromagnetic radiation 1 is generated within an upwardly open resonator cell 5, which is also referred to as an acoustic resonator, and meets a surface portion 9 of the surface of a resonator cell wall 7. The upwardly open resonator cell 5 therein represents a resonator for longitudinal waves.

In the course of performing a first embodiment of the method according to the invention with the first embodiment of the device according to the invention shown in FIG. 1, the first electromagnetic radiation is absorbed completely or in part by the resonator cell wall 7, which, in the sense of the present invention, represents an absorption element. This leads to local heating of the resonator cell wall 7 in the region of the surface portion 9. If the cavity enclosed by the acoustic resonator is filled with a fluid mixture comprising a sample fluid, for example ambient air comprising a sample gaseous mixture in the form of water vapour (sample gas), due to heat transfer, local heating of the sample gaseous mixture also takes place in the region of the surface portion 9, since the resonator cell wall 7 is in contact with the sample gaseous mixture. The heating of the sample gaseous mixture is then accompanied by an increase in the pressure energy within the sample gaseous mixture.

Seen overall, at least a portion of the radiation energy of the first electromagnetic radiation is consequently firstly converted into thermal energy in the resonator cell wall 7 and then into pressure energy in the sample gaseous mixture.

In the course of carrying out the first embodiment of the method according to the invention, the first electromagnetic radiation 1 shown in FIG. 1 is amplitude modulated or frequency modulated. Preferably, an amplitude modulation takes place. By modulating the first electromagnetic radiation at a modulation frequency, a periodic variation in the energy transfer is brought about with the corresponding modulation frequency. Consequently, with the modulation frequency, periodic pressure energy is produced within the sample gas. In accordance with hydrodynamic laws, this leads to the formation of a pressure wave 10 (sound wave) in the sample gas within the acoustic resonator 5. The pressure wave 10 forms in the acoustic resonator as a standing wave, which is magnified less or more strongly in dependence upon the closeness of the exciting frequency to the actual resonant frequency.

The pressure variation in the form of a standing wave within the acoustic resonator 5 generated by such a sound wave 10 is measured by means of a microphone 6 disposed at the bottom of the acoustic resonator 5. In the sense of the present application, the signal measured therein is described as an acoustic response signal 10 of the acoustic resonator generated by absorption of the first electromagnetic radiation. In this sense, a resonant amplification of the standing sound wave measured by the microphone is also to be understood as an acoustic response signal. In a further step, the amplitude or phase is determined from the response signal.

The terms "sound wave" and "acoustic response signal" are used synonymously within the sense of the present invention. The term "sound wave" is in the narrower sense the physical description of the pressure variation taking place in the acoustic resonator 5 and the term "acoustic response signal" is in the narrower sense the technical measurement description of the pressure change or resonant amplification occurring in the acoustic resonator 5.

The modulation frequency of the first electromagnetic radiation is subsequently varied so that an amplitude or phase of the response signal is determined for each modulation frequency. The plurality of amplitudes or phases then results in an amplitude response or phase response.

From the thus determined amplitude response or phase response, conclusions can be drawn about the property of the fluid or fluid mixture located in the acoustic resonator 5, such as sound velocity, density or concentration, directly or after upstream determination of the resonant frequency of the acoustic resonator. In particular, if the fluid located in the acoustic resonator 5 is gaseous water/water vapour ($H_2O$), conclusions can be drawn on the velocity of sound within the water vapour and thus also on the density of the water vapour.

The arrangement shown in FIG. 1 can be used in parallel or separately to determine the resonant frequency or other properties of the acoustic resonator 5.

To determine the resonant frequency, the modulation frequency of the first electromagnetic radiation 1 is also varied, for example, within a frequency interval at which the resonant frequency is expected due to the geometrical dimension of the resonator cell 5. In other words, the modulation frequency of the first electromagnetic radiation 1 is tuned and determined with the measurement of the acoustic response signal of the amplitude response or phase response of the acoustic resonator. From the amplitude response, it is then determined for which modulation frequency the amplitude of the acoustic response signal has a maximum. The modulation frequency thus determined corresponds to the resonant frequency of the acoustic resonator.

Moreover, based upon the determined amplitude response or phase response of the acoustic response signal, the damping properties of the acoustic resonator can also be deduced.

For example, the damping coefficient or portions of the damping coefficient tensor of the acoustic resonator are determined from the amplitude response or phase response. Knowledge of the damping coefficient or parts of the damping coefficient tensor of the acoustic resonator, in turn, allow conclusions to be drawn regarding the concentration of a sample gas within the acoustic resonator.

Alternatively or in addition to tuning the modulation frequency of the first electromagnetic radiation 1, a wideband excitation of a sound wave 10 can also take place within the acoustic resonator 5. For this purpose, the first electromagnetic radiation 1 is modulated, for example, with a rectangular function. A rectangular function contains a plurality of modulation frequencies. Accordingly, a spectrally wide-band sound wave 10 is also generated by the absorption of the first electromagnetic radiation 1. The acoustic response signal measured by means of the acoustic microphone 6 also contains a plurality of frequencies. By means of a frequency analysis, which is usually a fast Fourier transform (FFT), an amplitude response or phase response can thus be calculated directly from the measured acoustic response signal. Based upon the amplitude response, the resonant frequency of the acoustic resonator can in turn be determined by finding a maximum.

FIG. 2 shows a second embodiment of the device 200 according to the invention. Herein, two separate radiation sources 3 and 4 are provided. The first radiation source 3 generates the first electromagnetic radiation 1 and the second radiation source 4 generates the second electromagnetic radiation 2. In this embodiment, the second radiation source 4 generates a parallel beam path.

For example, the second radiation source 4 can be an infrared laser.

The device 200 according to the invention shown in FIG. 2 is provided, in particular, for carrying out a photoacoustic method according to the invention, in which the property of a sample fluid contained in the acoustic resonator 5 is determined by means of the second electromagnetic radiation 2. The second electromagnetic radiation 2 is advantageously amplitude modulated or frequency modulated with the resonant frequency of the acoustic resonator 5. To track this resonant frequency, the first electromagnetic radiation 1 is used, which is incident upon a resonator cell wall 7 and is absorbed there in the surface portion 9. As already described in relation to FIG. 1, a method for determining the currently applicable resonant frequency of the acoustic resonator can be performed by means of the first electromagnetic radiation 1. The result of this method may then be used to adjust the modulation frequency of the second electromagnetic radiation 2 to the currently valid resonant frequency of the acoustic resonator.

In the embodiment shown in FIG. 2, the second electromagnetic radiation enters the acoustic resonator through a first window 8. The second electromagnetic radiation has a wavelength corresponding to an absorption wavelength of the sample fluid located in the acoustic resonator. Consequently, along the beam path of the second electromagnetic radiation 2, local heating of the sample fluid occurs and thus—also due to the modulation of the second electromagnetic radiation—a sound wave forms that is detected by the microphone 6 as an acoustic response signal generated by the absorption of the second electromagnetic radiation by the sample fluid. The second electromagnetic radiation then exits the acoustic resonator again through the second window 8' without the second electromagnetic radiation being absorbed by an element of the acoustic resonator.

The acoustic response signal and/or the sound wave generated by the second electromagnetic radiation is not shown in FIGS. 2 to 4. Rather, the sound wave 10 generated by the absorption of the first electromagnetic radiation is shown in FIGS. 2 to 4 and also in FIG. 1.

FIG. 3 shows a third embodiment of the device 300 according to the invention. This differs from the device 200 shown in FIG. 2 in that the second radiation source 4 creates a divergent and not a parallel beam path. In addition, the first electromagnetic radiation 1 and the second electromagnetic radiation 2 are coupled into the acoustic resonator 5 via a lens 11, and both via a first window 8 of the resonator cell 7. The window 8 is configured to be transparent for both the first and second electromagnetic radiation. The lens 11 is arranged and configured such that the first electromagnetic radiation 1 is directed through the lens 11 onto the absorption element, in this case the resonator cell wall 7, and the second electromagnetic radiation 2 is guided through the same lens 11 such that it passes through the resonator cell 5 without wall contact.

In FIG. 4, a fourth embodiment 400 of the device according to the invention and the method according to the invention is shown. This differs from the embodiment 200 shown in FIG. 2 in that the first radiation source 3 for generating the first electromagnetic radiation 1 is arranged within the acoustic resonator 5 and/or is connected to the acoustic resonator 5 in such a way that the first electromagnetic radiation 1 is generated within the acoustic resonator 5. In addition, an absorption plate 12 is provided as an absorption element, wherein the absorption plate 12 is fixedly connected to the resonator cell 5. In the embodiment shown in FIG. 4, the first radiation source 3 is integrated into the resonator cell wall, wherein the resonator cell wall 7 in question is opposite the absorption surface portion 9 of the absorption plate 12, such that the first electromagnetic radiation 1 is guided substantially at a right angle to the second electromagnetic radiation 2 and is incident upon the absorption plate 12 which is arranged opposite the first radiation source 3. To measure an acoustic response signal, as distinct from the embodiment 200 shown in FIG. 2, an acoustic flow sensor 6 is provided, which is attached to a resonator cell wall 7 and which is arranged in the cavity enclosed by the acoustic resonator such that it does not project into the beam paths of the first and second electromagnetic radiation.

For the purpose of the original disclosure, it should be noted that all of the features as they become apparent to a person skilled in the art from the present description, the drawings, and the claims, even if they have been specifically described only in connection with specific other features, can be combined both individually and also in any combination with other features or groups of features disclosed here, insofar as this has not been expressly excluded or technical circumstances make such combinations impossible or pointless. A comprehensive, explicit presentation of all conceivable combinations of features is omitted herein solely for the sake of the brevity and legibility of the description.

Although the invention has been presented and described in detail in the drawings and the foregoing description, this representation and description is merely an example and is not intended to limit the scope of protection as defined by the claims. The invention is not limited to the disclosed embodiments.

Modifications of the disclosed embodiments will be obvious to those skilled in the art from the drawings, the description and the appended claims. In the claims, the word "comprise" does not exclude other elements or steps, and the indefinite article "a" does not exclude a plurality. The mere fact that certain features are claimed in different claims does not preclude their combination. Reference signs in the claims are not intended to limit the scope of protection.

REFERENCE SIGNS

1 First electromagnetic radiation
2 Second electromagnetic radiation
3 First radiation source
4 Second radiation source
5 Acoustic resonator (resonator cell)
6 Microphone
6' Acoustic flow sensor
7 Resonator cell wall
8 First window
8' Second window
9 Surface portion
10 Sound wave (acoustic response signal) generated by absorption of the first electromagnetic radiation taking place in step b)
11 Lens
12 Absorbent plate
100 First embodiment of the device
200 Second embodiment of the device
300 Third embodiment of the device
400 Fourth embodiment of the device
A Amplitude of the acoustic response signal
φ Phase of the acoustic response signal
F Modulation frequency
A(F) Amplitude response
φ(F) Phase response

The invention claimed is:

1. A method having the following steps:
   a) according to a first alternative, providing an acoustic resonator, the acoustic resonator comprising an absorption element having a surface portion,
   providing a sample fluid or a fluid mixture comprising the sample fluid such that the acoustic resonator is filled with the sample fluid or the fluid mixture comprising the sample fluid,
   wherein the surface portion of the absorption element is in contact with the sample fluid or the fluid mixture comprising the sample fluid,
   or
   according to a second alternative, providing an acoustic resonator,
   providing a fluid mixture comprising a sample fluid such that the acoustic resonator is filled with the fluid mixture,
   wherein the fluid mixture comprises, in addition to the sample fluid, at least one absorption fluid or one or more absorption particles,
   b) according to the first alternative, irradiating the surface portion of the absorption element with a first electromagnetic radiation such that the absorption element at least partially absorbs the first electromagnetic radiation in the region of the surface portion,
   or
   according to the second alternative, irradiating the fluid mixture with a first electromagnetic radiation such that the absorption fluid or the absorption particles at least partially absorb the first electromagnetic radiation,
   such that, in both alternatives, by way of the absorption, pressure energy is produced in the sample fluid or the fluid mixture comprising the sample fluid, wherein the first electromagnetic radiation is amplitude modulated or frequency modulated at a modulation frequency,
   c) measuring an acoustic response signal of the acoustic resonator generated by the absorption of the first electromagnetic radiation taking place in step b),
   d) determining at least one amplitude or phase of the acoustic response signal having the modulation frequency of the first electromagnetic radiation, and
   e) determining an amplitude response or phase response dependent upon the modulation frequency from the at least two amplitudes or phases determined in step d) of the acoustic response signal,
   wherein step b) is performed at least twice, wherein in a first performance of step b), the first electromagnetic radiation is modulated at a first modulation frequency and in a second performance of step b), is modulated at a second modulation frequency, wherein the second modulation frequency is different from the first modulation frequency, such that in step d) at least a first amplitude or phase of the acoustic response signal for the first modulation frequency, and a second amplitude or phase of the acoustic response signal for the second modulation frequency, are determined.

2. The method according to claim 1, wherein in step b) the first electromagnetic radiation is amplitude modulated or frequency modulated such that a wide-band acoustic response signal of the acoustic resonator is generated.

3. The method according to claim 2, wherein the first electromagnetic radiation is amplitude modulated with a square wave signal.

4. The method according to claim 2, wherein the determination in step f) includes applying a Fourier transform to the wide-band acoustic response signal measured in step c).

5. A method having the following steps:
   a) according to a first alternative, providing an acoustic resonator, the acoustic resonator comprising an absorption element having a surface portion,
   providing a sample fluid or a fluid mixture comprising the sample fluid such that the acoustic resonator is filled with the sample fluid or the fluid mixture comprising the sample fluid,
   wherein the surface portion of the absorption element is in contact with the sample fluid or the fluid mixture comprising the sample fluid,
   or
   according to a second alternative, providing an acoustic resonator,
   providing a fluid mixture comprising a sample fluid such that the acoustic resonator is filled with the fluid mixture,
   wherein the fluid mixture comprises, in addition to the sample fluid, at least one absorption fluid or one or more absorption particles,
   b) according to the first alternative, irradiating the surface portion of the absorption element with a first electromagnetic radiation such that the absorption element at least partially absorbs the first electromagnetic radiation in the region of the surface portion,
   or
   according to the second alternative, irradiating the fluid mixture with a first electromagnetic radiation such that the absorption fluid or the absorption particles at least partially absorb the first electromagnetic radiation,
   such that, in both alternatives, by way of the absorption, pressure energy is produced in the sample fluid or the fluid mixture comprising the sample fluid, wherein the first electromagnetic radiation is amplitude modulated or frequency modulated at a modulation frequency, c) measuring an acoustic response signal of the acoustic resonator generated by the absorption of the first electromagnetic radiation taking place in step b), d) determining at least one amplitude or phase of the acoustic response signal having the modulation frequency of the first electromagnetic radiation, wherein the first electromagnetic radiation comprises a frequency of the alternating electromagnetic field, wherein the frequency of the alternating electromagnetic field is not equal to an absorption frequency of the sample fluid.

6. The method according to claim 5, wherein the first electromagnetic radiation comprises a wavelength or a wavelength range that is between 380 nm and 1200 nm.

7. A method having the following steps:

a) according to a first alternative, providing an acoustic resonator, the acoustic resonator comprising an absorption element having a surface portion, providing a sample fluid or a fluid mixture comprising the sample fluid such that the acoustic resonator is filled with the sample fluid or the fluid mixture comprising the sample fluid, wherein the surface portion of the absorption element is in contact with the sample fluid or the fluid mixture comprising the sample fluid, or according to a second alternative, providing an acoustic resonator, providing a fluid mixture comprising a sample fluid such that the acoustic resonator is filled with the fluid mixture, wherein the fluid mixture comprises, in addition to the sample fluid, at least one absorption fluid or one or more absorption particles, b) according to the first alternative, irradiating the surface portion of the absorption element with a first electromagnetic radiation such that the absorption element at least partially absorbs the first electromagnetic radiation in the region of the surface portion, or according to the second alternative, irradiating the fluid mixture with a first electromagnetic radiation such that the absorption fluid or the absorption particles at least partially absorb the first electromagnetic radiation, such that, in both alternatives, by way of the absorption, pressure energy is produced in the sample fluid or the fluid mixture comprising the sample fluid, wherein the first electromagnetic radiation is amplitude modulated or frequency modulated at a modulation frequency, c) measuring an acoustic response signal of the acoustic resonator generated by the absorption of the first electromagnetic radiation taking place in step b), d) determining at least one amplitude or phase of the acoustic response signal having the modulation frequency of the first electromagnetic radiation, wherein in a further step, a property of the acoustic resonator is determined.

8. A photoacoustic method for determining a property of the sample fluid, wherein the sample fluid is a sample gas, having the following steps:

aa) determining a resonant frequency of the acoustic resonator using the method according to claim 7, bb) irradiating the sample gas or the gaseous mixture comprising the sample gas with a second electromagnetic radiation, wherein the second electromagnetic radiation comprises at least one frequency of its alternating electromagnetic field that is equal to an absorption frequency of the sample gas, and wherein the second electromagnetic radiation is amplitude modulated or frequency modulated at a modulation frequency, wherein the modulation frequency is substantially equal to the resonant frequency of the acoustic resonator determined in step aa), cc) measuring an acoustic response signal of the acoustic resonator generated by an absorption by the sample gas of the second electromagnetic radiation which takes place in step bb), dd) determining the property of the sample gas from the acoustic response signal of the acoustic resonator.

9. The method according to claim 8, wherein the property of the sample gas is the density or concentration of the sample gas.

10. The method according to claim 8, wherein the property of the sample gas is determined multiple times over a process duration at least with steps bb), cc) and dd), wherein, during the duration of the method, the resonant frequency of the acoustic resonator is determined by means of step aa), such that, when performing step bb), the modulation frequency of the second electromagnetic radiation is always equal to the currently determined resonant frequency.

11. The method according to claim 8, wherein the second electromagnetic radiation has a wavelength or wavelength range that is between 780 nm and 1 mm.

12. The method according to claim 8, wherein the second electromagnetic radiation is guided such that it is not absorbed by a surface of the acoustic resonator.

13. The method according to claim 7, wherein one of the following steps or both of the following steps can be provided:

g) determining a resonant frequency of the acoustic resonator from at least one amplitude or phase determined in step d), h) determining a damping property of the acoustic resonator.

14. The method according to claim 1, wherein in a further step, a property of the fluid or fluid mixture located in the acoustic resonator is determined.

15. The method according to claim 14, wherein one of the following steps or both of the following steps can be provided:

i) determining a velocity of sound of the fluid or fluid mixture located in the acoustic resonator, or j) determining a density of the fluid or fluid mixture located in the acoustic resonator, or a concentration of the sample fluid, if the sample fluid is a constituent of a fluid mixture located in the acoustic resonator.

16. A device having at least one radiation source for generating a first electromagnetic radiation, an acoustic resonator comprising an absorption element having a surface portion, the surface portion of the absorption element being arranged such that the surface portion is in contact with a sample fluid or a fluid mixture comprising the sample fluid when the acoustic resonator is filled with the sample fluid or the fluid mixture comprising the sample fluid, wherein the absorption element is configured to at least partially absorb the first electromagnetic radiation in the region of the surface portion such that pressure energy is generated in the sample fluid or the fluid mixture comprising the sample fluid when the acoustic resonator is filled with the sample fluid or the fluid mixture comprising the sample fluid, a sonic sensor for measuring an acoustic response signal of the acoustic resonator, wherein the at least one radiation source and the acoustic resonator are configured and arranged such that the first electromagnetic radiation is incident upon the surface portion of the absorption element, wherein a radiation source is provided for generating a second electromagnetic radiation, wherein the acoustic resonator comprises a first opening or a first window at least partially transparent for the second electromagnetic radiation, wherein the acoustic resonator and the radiation source of the second electromagnetic radiation are configured and arranged such that the second electromagnetic radiation passes through the first opening or the first window into the acoustic resonator, and wherein the acoustic resonator comprises a second opening or a second window, which is at least partially transparent for the second electromagnetic radiation, wherein the acoustic resonator and the radiation source of the second electromagnetic radiation are configured and arranged, such that the second electromagnetic radiation passes through the second opening or the second window out of the acoustic resonator.

17. The device according to claim 16, wherein the acoustic resonator is configured so that by irradiating the surface portion with the first electromagnetic radiation in the case of an acoustic resonator filled with the sample fluid within the acoustic resonator a standing sound wave with at least one pressure maximum forms, wherein the acoustic resonator and the radiation source of the first electromagnetic radiation are configured and arranged such that the surface portion irradiated by the first electromagnetic radiation is arranged at a location, which is substantially equal to the location of the pressure maximum of the standing sound wave.

18. The device according to claim 16, wherein a first radiation source for generating the first electromagnetic radiation and a separate second radiation source for generating the second electromagnetic radiation are provided.

19. The device according to claim 18, wherein the first radiation source is an LED in the visible spectral region and the second radiation source is an LED in the infrared spectral region.

20. The device according to claim 16, wherein the radiation source of the first electromagnetic radiation is configured and arranged such that the first electromagnetic radiation enters the acoustic resonator through an opening or a window, wherein, in the case of a window, the window is at least partially transparent for both the first and second electromagnetic radiation, or alternatively, the radiation source of the first electromagnetic radiation is configured and arranged such that the first electromagnetic radiation is generated within the acoustic resonator.

21. A method comprising measuring exhaust gas in a motor vehicle or pollutants in ambient air using the device according to claim 16.

* * * * *